(12) United States Patent
Luo

(10) Patent No.: US 9,331,980 B2
(45) Date of Patent: *May 3, 2016

(54) SECURE IN-BAND SIGNALING METHOD FOR MOBILITY MANAGEMENT CROSSING FIREWALLS

(71) Applicant: AT&T INTELLECTUAL PROPERTY II, L.P., Atlanta, GA (US)

(72) Inventor: Hui Luo, Marlboro, NJ (US)

(73) Assignee: AT&T INTELLECTUAL PROPERTY II, LP, Atlanta, GA (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/846,956

(22) Filed: Mar. 19, 2013

(65) Prior Publication Data

US 2013/0227671 A1 Aug. 29, 2013

Related U.S. Application Data

(63) Continuation of application No. 12/041,021, filed on Mar. 3, 2008, now Pat. No. 8,447,879, which is a continuation of application No. 11/588,096, filed on Oct. 26, 2006, now Pat. No. 7,353,290, which is a continuation of application No. 10/298,406, filed on Nov. 18, 2002, now Pat. No. 7,146,428.

(60) Provisional application No. 60/339,953, filed on Dec. 12, 2001.

(51) Int. Cl.
| | |
|---|---|
| *G06F 13/00* | (2006.01) |
| *H04L 29/06* | (2006.01) |
| *H04W 12/12* | (2009.01) |
| *H04W 36/00* | (2009.01) |
| *H04W 80/04* | (2009.01) |

(52) U.S. Cl.
CPC ............... *H04L 63/02* (2013.01); *H04L 29/06* (2013.01); *H04L 63/029* (2013.01); *H04L 63/08* (2013.01); *H04L 63/1458* (2013.01); *H04W 12/12* (2013.01); *H04W 36/0011* (2013.01); *H04W 80/04* (2013.01)

(58) Field of Classification Search
CPC ... H04L 29/06; H04L 63/029; H04L 63/1458; H04L 63/08; H04L 63/02; H04W 36/0011; H04W 12/12; H04W 80/04
USPC ......................... 709/237, 202, 245; 726/26, 4
See application file for complete search history.

(56) References Cited

U.S. PATENT DOCUMENTS

| | | | |
|---|---|---|---|
| 6,195,705 | B1 | 2/2001 | Leung |
| 6,487,605 | B1 | 11/2002 | Leung |

(Continued)

*Primary Examiner* — Kenneth R Coulter

(74) *Attorney, Agent, or Firm* — Guntin & Gust, PLC; Joseph Hrutka

(57) ABSTRACT

An in-band signaling method that enables secure updates of a care-of-IP address for a mobile host that roams between access networks. In the illustrative embodiment described herein, a mobile host includes an intelligent interface that handles IP networking functions and tunnels IP packets between the mobile host and the mobile host's home agent/remote access server (HA/RAS) transparently, as if the mobile host established a connection to a communicating or destination host (DST) from the home network (where the HA/RAS resides). In accordance with an aspect of the invention, there is provided an in-band signaling method that employs encrypted three-way handshake signaling messages that are embedded in encapsulated IP packets to enable care-of IP address updates. This method can effectively protect mobile hosts from denial-of-service attacks and is transparent to NAT/NAPT firewalls. The signaling messages are communicated between the home agent and the mobile host, in a manner transparent to any NAT/NAPT firewall in the network.

20 Claims, 2 Drawing Sheets

(56) References Cited

U.S. PATENT DOCUMENTS

| | | |
|---|---|---|
| 6,915,325 B1 | 7/2005 | Lee |
| 6,988,146 B1 | 1/2006 | Magret |
| 7,146,428 B2 | 12/2006 | Luo |
| 7,353,290 B2 | 4/2008 | Luo |
| 8,447,879 B2 * | 5/2013 | Luo ................................ 709/237 |
| 2002/0131386 A1 * | 9/2002 | Gwon ........................... 370/338 |
| 2003/0016655 A1 | 1/2003 | Gwon |
| 2003/0158938 A1 | 8/2003 | Adatrao |
| 2004/0047348 A1 | 3/2004 | O'Neil |

* cited by examiner

SECURE IN-BAND SIGNALING METHOD FOR MOBILITY MANAGEMENT CROSSING FIREWALLS

CROSS-REFERENCE TO RELATED APPLICATIONS

This application is a continuation of and claims priority to U.S. patent application Ser. No. 12/041,021 filed Mar. 3, 2008, which was a continuation of U.S. patent application Ser. No. 11/588,096 filed Oct. 26, 2006 now U.S. Pat. No. 7,353,290, which was a continuation of U.S. patent application Ser. No. 10/298,406 filed Nov. 18, 2002 now U.S. Pat. No. 7,146,428, which claims priority to Provisional Application Ser. No. 60/339,953 filed on Dec. 12, 2001, the disclosures of all of which are incorporated herein by reference in their entirety.

FIELD OF THE DISCLOSURE

The present invention relates generally to mobile networking, and more particularly, to method for securely updating a care-of-IP address across a NAT (network address translation)/NAPT (network address-port translation) firewall without the need to coordinate the update with the firewall.

BACKGROUND

Mobile IP is a protocol that enables a mobile host to roam from one access network to another without loss of IP connectivity. In Mobile IP, a special entity referred to as a home agent, is deployed on the Internet to track the location of mobile computers (hosts) and to route IP packets to them irrespective of their physical locations. A mobile host owns a fixed IP address that belongs to the subnet of the home agent. Any application programs running on the mobile host use this fixed IP address as the source IP address during network communications. Whenever the mobile computer attaches to a subnet, a care-of IP address belonging to the subnet is reported to the home agent, so that the home agent can route inbound IP packets to the mobile host's current location using an IP tunnel. If a foreign agent is deployed on the subnet, the foreign agent's IP address is the mobile's care-of IP address. If there is no foreign agent, the mobile must have a built-in foreign agent, and it needs to apply an IP address from the subnet for this built-in foreign agent.

All IP packets destined for the mobile host are intercepted by the home agent when they arrive at the home agent's subnet. The home agent encapsulates these packets into new IP packets with the home agent's IP address as source IP address and the care-of IP address as destination IP address. When they arrive at the foreign agent, the encapsulated packets are decapsulated, and the inner IP packets are delivered to the TCP/IP stack of the mobile host. IP packets that are communicated from the mobile host to a destination host are encapsulated into new IP packets by the foreign agent. The outer source IP address is the care-of IP address, and the outer destination IP address is the home agent's IP address.

Due to security concerns and the insufficiency of IPv4 address, many Internet Service Providers (ISPs) and corporate networks use NAT/NAPT technologies in their firewall gateways. This makes mobility management very difficult because it affects the conventional update signaling of care-of IP addressing. According to current methods, either the mobile host cannot securely update its own care-of IP address that is behind the firewall with its mobility router outside of firewall, or complicated signaling methods are needed to coordinate communications between the mobile host, the firewall gateway, and the mobility router. Neither is a satisfactory solution. Accordingly, there exists a need for a new in-band signaling method for mobility management, which assures secure updates of care-of IP addresses across a firewall and which does not require coordination with the firewall. In accordance with an aspect of the invention, there is provided an in-band signaling method that employs encrypted three-way handshake signaling messages that are embedded in encapsulated IP packets to enable care-of IP address updates. This method can effectively protect mobile hosts from denial-of-service attacks and is transparent to NAT/NAPT firewalls. The signaling messages are communicated between the home agent and the mobile host, in a manner transparent to any NAT/NAPT firewall in the network.

DETAILED DESCRIPTION

Referring now to the several views of the drawings, there is provided an in-band signaling method that enables secure updates of a care-of-IP address for a mobile host that roams between access networks. In the illustrative embodiment shown and described herein, a mobile host includes an intelligent interface that handles IP networking functions and tunnels IP packets between the mobile host and the mobile host's home agent/remote access server (HA/RAS) transparently, as if the mobile host established a connection to a communicating or destination host (DST) from the home network (where the HA/RAS resides). The details of the intelligent interface are disclosed in commonly owned copending U.S. patent application Ser. No. 10/026,589, filed Dec. 19, 2001, the disclosure of which is hereby incorporated by reference.

Figure 1:
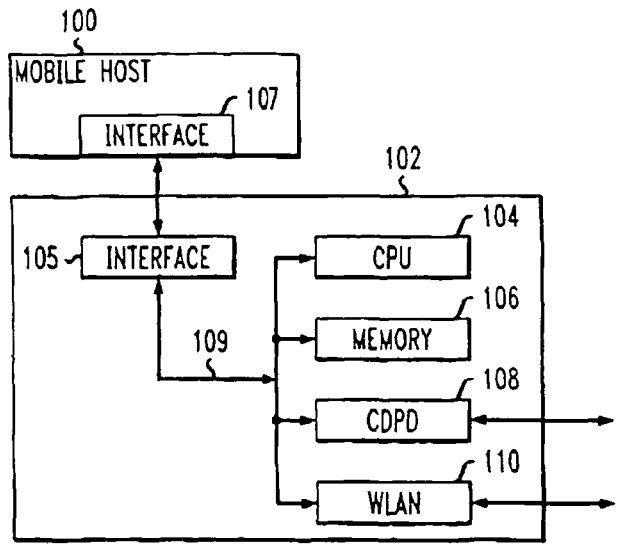
FIG. 1 is a schematic diagram of a mobile host and intelligent interface.

Referring now to FIG. 1, a host 100 is a network access device such as a personal computer, information appliance, personal data assistant, data-enabled wireless handset, or any other type of device capable of accessing information through a packet-switched data network. For the purpose of illustration, the host 100 is referred to hereinafter as a "mobile host", although it will be appreciated by those skilled in the art that the host may be "non-mobile." Each mobile host 100 has an intelligent device that is identified generally by the reference numeral 102. The intelligent device 102 emulates a standard network interface device on a mobile host 100 and controls one or multiple network interfaces to enable the mobile host 100 to access different networks. The intelligent device 100 includes a dedicated central processing unit (CPU) 104 and memory 106, thereby operating as an independent microcomputer. The device 102 provides intelligent processing to network traffic traveling to and from a host machine through the processor embedded on the card. In lieu of a pure software implementation, the intelligent interface can be a logical module that appears as an intermediate network device driver (such as an NDIS-compliant driver in Windows system). to control one or a plurality of different network interface devices installed on the mobile host. In this instance, the logical module obtains the mobile host's CPU cycles whenever a layer-3 packet is written to the device driver by the mobile host or a layer-2 frame is admitted by one of network interface devices. Utilizing a timer callback function, the logical module periodically "steals" the mobile host's CPU cycles for monitoring all network interfaces. In the illustrative embodiment, the intelligent device emulates an Ethernet card installed on the mobile host 100. To access, for example, a CDPD network and WLAN, the intelligent device 102 has two network interface devices, a CDPD modem 108 and a WLAN card 110. The components of the intelligent device 102 are connected via a bus 108 in accordance with conventional practice. The intelligent device 102 has an appropriate interface 105, like a PCMCIA card, for connecting to the mobile host 100 via a corresponding interface 107. The intelligent device 102 has two Ethernet MAC addresses—MAC 1 and MAC 2. MAC 1 is "owned" by the "emulated Ethernet card" 102 and is therefore known to the mobile host 100. The intelligent device 102 utilizes MAC 2 to emulate the MAC address of the first-hop router to the mobile host 100. In the exemplary embodiment, WLAN is considered to be the "best" access network. That is, if the mobile host is under coverage of a WLAN, the intelligent device 102 will always use the WLAN as the access network. The intelligent device 102 may also switch to a different network while remaining on the same type of access network. e.g. a different WLAN network.

In the first group of examples, the Dynamic Host Configuration Protocol (DHCP) is utilized to configure the network address. See R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein.

Figure 2:
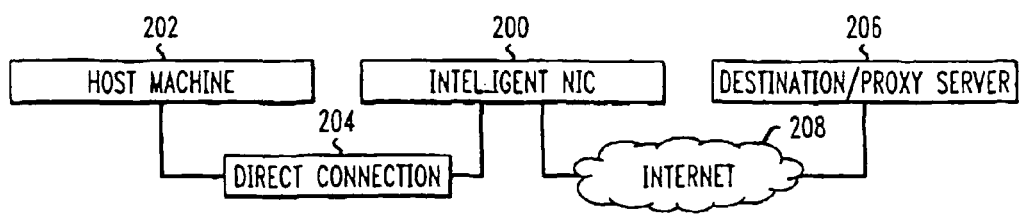
FIG. 2 is a schematic diagram of a host, intelligent interface and proxy server.

Referring now to FIG. 2, there is shown a general schematic of a system utilizing an intelligent device 200 in accordance with the invention. The intelligent device 200 is connected to the mobile host 202 through a standard physical interface 204, or the intelligent interface 200 is considered logically to be the next hop from the mobile host 202. The intelligent device 200 connects the mobile host 202 to a destination or proxy server 206 over a network (shown as Internet 208). In the first example, the intelligent device 200 is embodied in a PC or PCI card that plugs directly into the mobile host, or an external entity that connects to the mobile host through a USB, serial bus, etc. In the second example, a PPP connection may exist between the intelligent device and the mobile host. Thus, even though the intelligent device and the mobile host 202 can be separated physically by multiple networks, the intelligent device 200 is logically just a "single hop" from the host machine 202. It is also independent of the underlying network to be supported. The intelligent device 200 can be made to provide a number of network interfaces, depending on the application and card technology. For instance, the intelligent device 200 may be embodied in a WLAN PC card that has a 16 bit or CardBus interface as defined by the PCMCIA standard. Alternatively, the intelligent device 200 can be an Ethernet (compact) PCI card for a desktop system that connects to the host machine through a PCI bus. It can also be a PC card with both WLAN and WCDMA interfaces, as illustrated schematically in FIG. 1. In yet another expedient, the device 200 can characterized as a "card caddy," which enables another CF or PCMCIA card that functions as the network interface device to be plugged into the device 200. The intelligent device 200 can either be a standalone entity or incorporated into the host machine. For example, the intelligent device 200 can be a part of the hardware of the host machine 202 and configured to preprocess data that is then passed to hardware associated with the mobile host 200. This arrangement may be employed with laptop machines that have Ethernet and WLAN interfaces built in. For the purpose of illustration herein, we use the PC card and CardBus as exemplary embodiments of the intelligent interface. It will be understood by those skilled in the art that the intelligent interface can be embodied in many other forms.

Figure 3:
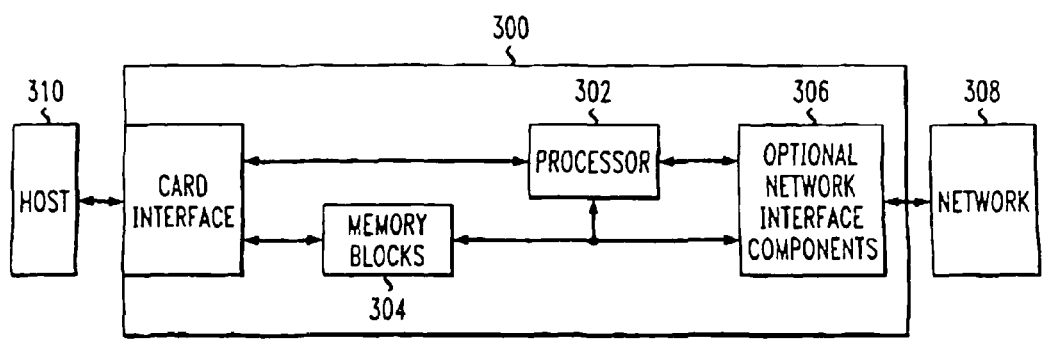
FIG. 3 is a schematic diagram of an intelligent interface.

FIG. 3 is a schematic drawing of the key components of an intelligent device 300 in accordance with the invention embodied in a card structure (ICARD). The ICARD 300 comprises three basic parts: a central processing unit (CPU) 302, a number of memory blocks 304, and some optional network interface components characterized at 306. The CPU 302 may be dedicated to the networking and application functions reside on the card. Alternatively, it may also handle physical and MAC layer functions for sending/receiving data. The card 300 can provide intelligent processing to network traffic 308 communicated to and from a host machine 310 through the CPU 302 in the card 300. The memory blocks 304 include volatile memory (such as RAM) and non-volatile memory (such as Flash memory). The CPU 302 can communicate directly with the host machine 310 through an I/O card interface 312, or through the shared memory 304 on the card 300. Packets communicated to and from the network interface 306 may or may not be processed by the CPU 302 depending on the packet type and several other system factors, none of which is relevant to the present invention.

For the purpose of illustration, it is assumed that the intelligent interface has established a security association with the HA/RAS. In other words, the mobile host has been authenticated to the HA/RAS and all encapsulated IP packets transmitted in the tunnel between the intelligent interface and the HA/RAS are encrypted using a key shared in the security association (See IPsec RFC for the definition of Security Association).

The mobile host is in the middle of a vertical handoff procedure (i.e., handoff between two different networks). In this regard, the mobile host is departing from a first access network (AN1, for example, a cellular network) and arriving at a second access network (AN2, for example, a WLAN).

Both access networks run NAT/NAPT at their firewalls to allow IP tunnels as long as the tunnel traffic is initiated from hosts on the subnet. The care-of IP address assigned to the mobile host by AN1 is IP.sub.iAN1. Its corresponding outside IP address is IP.sub.eAN1. The care-of IP address assigned to the mobile host by AN2 is IP.sub.iAN2. Its corresponding outside IP address is IP.sub.eAN2.

The intelligent interface only knows IP.sub.iAN1 and IP.sub.iAN2, but does not know about IP.sub.eAN1 and IP.sub.eAN2. The mobile host doesn't even know the existence of IP.sub.eAN1 and IP.sub.eAN2.

The intelligent interface has a CURRENT_CA_REQ register, a KEEP_REQUESTING timer, and a CONFIRM_LINGER timer. The HA/RAS has a CURRENT_CA_ACK register, a CURRENT_CARE-OF_ADDRESS register, a CANDIDATE_CARE-OF_ADDRESS, and a BI_CASTING timer for every mobile host it serves. These registers and timers are initialized to 0 except that the CURRENT_CARE-OF_ADDRESS register is IP.sub.eAN1.

Figure 4:
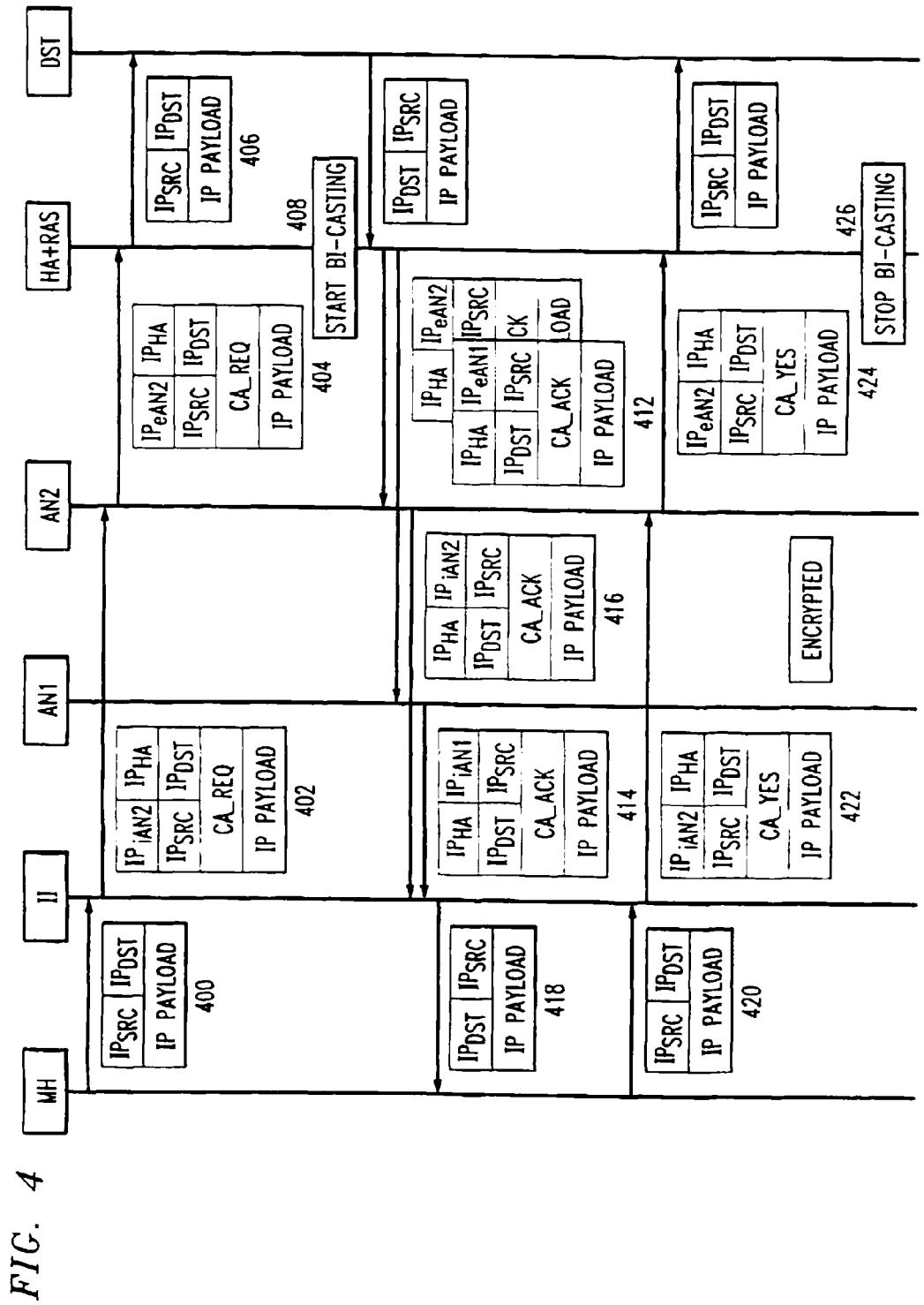
FIG. 4 is a flow diagram of a care-of IP address update protocol in accordance with the present invention.

Referring now to FIG. 4, an in-band signaling flow diagram illustrates how a care-of IP address is updated to the home agent right after the mobile host has been granted access to AN2, but the intelligent interface has not released access from AN1. The step-by-step procedure is described below.

At 400, immediately after the mobile host has been granted access to AN2, it sends an outbound IP packet to a destination host. The source IP address is IP.sub.SRC and the destination IP address is IP.sub.DST. If the mobile host does not generate any outbound IP packet at this moment, the intelligent interface will generate an empty IP packet and send out a CA_REQ message to the HA/RAS as soon as possible.

At 402, the intelligent interface embeds a CA_REQ message as an EP header in this IP packet, encapsulates it in a new IP packet with IP.sub.iAN2 and IP.sub.HA as the source and destination IP addresses respectively, and sends this IP-in-IP packet to the HA/RAS. The CA_REQ message signals the home agent to update the care-of IP address for the mobile host. IP.sub.HA is the IP address of the home agent. The CA_REQ message contains a sequence number, which is incremented by one whenever the mobile host wants to change to a new care-of IP address. The sequence number is stored in the CURRENT_CA_REQ register of the intelligent interface. The intelligent interface will keep inserting the same CA_REQ message into each subsequent outbound IP packet until a KEEP_REQUESTING timer expires or a corresponding CA_ACK message, which contains the same sequence number as that in the CURRENT_CA_REQ register, is received from the HA/RAS via AN2. After the KEEP_REQUESTING timer goes off, the intelligent interface aborts the care-of IP address update procedure and sticks with AN1.

At 404, when this IP-in-IP packet crosses the NAT/NAPT firewall of AN2, its source IP address is changed from IP.sub.iAN2 to IP.sub.eAN2 by the NAT/NAPT firewall. A NAT/NAPT box has two interfaces. Typically, the inner interface is a network interface, and assigns private IP addresses to any computer connected to it. The outer interface is a host interface. When a packet comes from inner interface to the outer interface, the NAT uses the IP address of its outer interface to replace the source IP address of the IP packet, which is a private IP address.

The IP-in-IP packet then arrives at the HA/RAS. After this packet is decapsulated, the HA/RAS finds the embedded CA_REQ message. It initially verifies the validity of this IP-in-IP packet based on the security association of the IP tunnel between the intelligent interface and the HA/RAS. If the EP-in-FP packet is valid, so is the CA_REQ message and the inner IP packet is forwarded to the destination host at 406 after the CA_REQ message is removed. If the inner IP packet is an empty one, the HA/RAS will drop it. The HA/RAS then checks whether the sequence number of the CA_REQ is less than or equal to that of the most recently received CA_REQ message. If this is not the case, the CA_REQ message is ignored because it has been updated by another CA_REQ message that was sent later by the intelligent interface but arrived earlier at the HA/RAS. Otherwise, the HA/RAS saves IP.sub.eAN2 in the CANDIDATE_CARE-OF_ADDRESS register and at 408 starts bicasting inbound IP packets to the mobile host at both care-of IP addresses IP.sub.cAN1 and IP.sub.eAN2. For inbound IP packets tunneled to IP.sub.eAN2, at 410 a CA_ACK message is embedded as an IP header of the inner IP packet, which contains the sequence number that was included in the CA_REQ message. The sequence number is also stored in a CURRENT_CA_ACK register at the HA/RAS. For inbound IP packets tunneled to IP.sub.eAN1, at 412 a no CA_ACK message is embedded. The bicasting operation will terminate after a corresponding CA_YES (or CA_NO) message, which contains the same sequence number as that in the CURRENT_CA_ACK register, is received from the mobile host or after a BI_CASTING timer expires. If the HA/RAS receives a CA_YES message that contains the same sequence number as the one contained in the CURRENT_CA_ACK register, the HA/RAS will recognize IP.sub.eAN2 as the new care-of IP address for the mobile host and saves it in the CURRENT_CARE-OF_ADDRESS register. In all other scenarios, the HA/RAS still considers IP.sub.eAN1 as the care-of IP address for the mobile host.

When the bi-cast IP-in-IP packets cross the firewalls of AN1 and AN2, at 414, 416 their destination IP addresses are changed from IP.sub.eAN1 to IP.sub.iAN1 and from IP.sub.eAN2 to IP.sub.iAN2, respectively.

The intelligent interface may receive the same inbound IP-in-IP packet from AN1 and AN2. After the packet is decapsulated, the intelligent interface finds the embedded CA_ACK message from the IP packet that is received from AN2. It first verifies the validity of this IP-in-IP packet based on the security association on the IP tunnel between the intelligent interface and the HA/RAS. If the IP-in-IP packet is valid, so is the CA_ACK message and the inner IP packet is submitted to the mobile host at 418 after the CA_ACK message is removed. The intelligent interface then checks whether the sequence number in the CA_ACK message is equal to the one stored in the CURRENT_CA_REQ register. If it is, the intelligent interface stops embedding CA_REQ messages in outbound IP packets received from the mobile host at 420. Instead, it clears the CURRENT_CA_REQ register and embeds a CA_YES message at 422, which contains the same sequence number as that in the CA_ACK message, in every subsequent outbound IP packet until the CONFIRM_LINGER timer expires. At this point, the intelligent interface may release network access to AN1. If the mobile host goes back to AN1 when the first CA_ACK message is received, which can happen if the mobile host stays at the boundary of AN2, the intelligent interface embeds a CA_NO message instead of CA_YES message.

When the IP-in-IP packet carrying the CA_YES message crosses the firewall of AN2 at 424, its source IP address is changed from IP.sub.iAN2 to IP.sub.eAN2. The IP-in-IP-packet carrying the CA_YES message arrives at the HA/RAS, where it is decapsulated, and the HA/RAS finds the embedded CA_YES message. It first verifies the validity of this IP-in-IP packet based on the security association on the IP tunnel between the intelligent interface and the HA/RAS. If the IP-in-IP packet is valid, so is the CA_YES message and the inner IP packet is submitted to the destination host after the CA_YES message is removed. The HA/RAS then checks whether the sequence number in the CA_YES message is equal to that in the CURRENT_CA_ACK register. If this is the case, the HA/RAS terminates the bicasting operation at 426, clears the CURRENT_CA_ACK register and the CANDIDATE_CARE-OF_ADDRESS register, and saves IP.sub.eAN2 in the CURRENT_CARE-OF_ADDRESS register. This completes the entire care-of IP address update process.

The above described in-band signaling method is resistant to denial-of-service attacks, assuming such attacks are implemented by either sending a fake CA_REQ message to the HA/RAS, or changing IP.sub.eAN2 to some other IP address.
1. It is impossible for the HA/RAS to be fooled by a fake IP-in-IP packet with a CA_REQ message embedded, because every IP-in-IP packet is encrypted and protected from modification and replay, based on the security association between the mobile host and the HA/RAS. 2. If it is occasional that IP.sub.eAN2 is changed to some arbitrary IP address, the HA/RAS will eventually receive some CA_REQ messages because the mobile host will keep embedding the same CA_REQ messages in every outbound IP packet till a corresponding CA_ACK message is received. The handoff process will succeed eventually. 3. If it is always the case that IP.sub.eAN2 is changed to some arbitrary IP address, the mobile host cannot receive any inbound IP packets via AN2. After both KEEP_REQUESTING timer and BI_CASTING timer expires, both the mobile host and the HA/RAS return to the previous state. That is, they both agree IP.sub.eAN1 continues to be the care-of IP address. No inbound IP packet is lost because the HA/RAS is in a bi-casting status and thus the mobile host always receives them via AN1.

The only way for a hacker to conduct a denial-of-service attack is to change the IP.sub.eAN2 to the IP address of the hacker's router and then to shut down the router after a few inbound IP packets have been forwarded to AN2 by the router. If this is the case, the hacker can be easily tracked down because his router's IP address is saved in the CURRENT_CARE-OF_ADDRESS register by the HA/RAS.

The present invention has been shown and described in what is considered to be the most practical and preferred embodiment. It is anticipated, however, that departures may be made therefrom and that obvious modifications will be implemented by those skilled in the art.

What is claimed is:

1. A tangible, machine-readable storage medium, comprising executable instructions that, when executed by a processor, facilitate performance of operations, comprising:
   assigning, to a mobile host, an inside IP address and an outside care-of IP address on each of a first access network and a second access network in response to the mobile host departing from the first access network and being granted access to the second access network, each of the first access network and the second access network comprising a firewall;
   encrypting a care-of address status message via a security association formed between the mobile host and a home agent of the first access network in response to receipt of the care-of address status message from the mobile host;
   storing the outside care-of IP address for the mobile host in a register; and
   receiving a new care-of address request message from the mobile host, the new care-of address request message comprising a destination address of a communicating host.

2. The tangible, machine-readable storage medium of claim 1, wherein the register comprises a CURRENT CARE OF ADDRESS register, and wherein the care-of address status message is embedded in an IP-in-IP packet.

3. The tangible, machine-readable storage medium of claim 2, wherein the care-of address status message comprises a same sequence number as a sequence number in a most recently received care-of address request message.

4. The tangible, machine-readable storage medium of claim 2, wherein the operations further comprise storing a sequence number from a most recently received care-of address request message.

5. The tangible, machine-readable storage medium of claim 2, wherein the new care-of address request message comprises a sequence number in an embedded IP-in-IP packet that comprises the destination address of a communicating host, the IP-in-IP packet further comprising the outside IP address assigned to the mobile host by the second access network that corresponds to the outside care-of IP address assigned to the mobile host by the second access network.

6. The tangible, machine-readable storage medium of claim 2, wherein the operations further comprise checking whether a sequence number contained in a new care-of address request message is less than or equal to a sequence number of a most recently received care-of address request message.

7. The tangible, machine-readable storage medium of claim 2, wherein the operations further comprise checking whether a sequence number contained in a new care-of address request message is less than or equal to a sequence number of a most recently received care-of address request message; and, if so, storing the outside care-of IP address for the mobile host on the second access network in a CANDIDATE CARE OF ADDRESS register.

8. The tangible, machine-readable storage medium of claim 2, wherein the operations further comprise checking whether a sequence number contained in a new care-of address request message is less than or equal to a sequence number of a most recently received care-of address request message; and, if so, bicasting packets to the mobile host at the outside care-of IP address for the mobile host on the second access network and at the outside care-of IP address for the mobile host on the first access network.

9. The tangible, machine-readable storage medium of claim 2, wherein the operations further comprise checking whether a sequence number contained in a new care-of address request message is less than or equal to a sequence number of a most recently received care-of address request message; and, if so, terminating a bicast of packets to the first and second access networks.

10. The tangible, machine-readable storage medium of claim 2, wherein the operations further comprise checking whether a sequence number contained in a new care-of address request message is less than or equal to a sequence number of a most recently received care-of address request message; and, if so:
   storing the outside care-of IP address for the mobile host on the second access network in a CANDIDATE CARE OF ADDRESS register;
   bicasting packets to the mobile host at the outside care-of IP address for the mobile host on the second access network, and the outside care-of IP address for the mobile host on the first access network; and
   terminating the bicasting of packets to the first and second access networks.

11. The tangible, machine-readable storage medium of claim 2, wherein the operations further comprise:
   bicasting packets to the mobile host at the outside care-of IP address for the mobile host on the second access network, and the outside care-of IP address for the mobile host on the first access network; and
   terminating the bicasting of packets to the first and second access networks after a BICASTING timer expires.

12. A device, comprising:
   a processor; and
   a memory that stores executable instructions that, when executed by the processor, facilitate performance of operations, comprising:
      forming a security association with a mobile host and a home agent, wherein the home agent is in a first access network;
      receiving a care of address request message in an IP-in-IP packet from the mobile host after the mobile host departs from the first access network and is granted access to a second access network, wherein the IP-in-IP packet is encrypted based on the security association;
      updating a care-of IP address for the mobile host responsive to the care of address request message; and forwarding packets to the mobile host via the care-of IP address.

13. The device of claim 12, wherein the IP-in-IP packet comprises a destination address of a communicating host.

14. A method, comprising:
  assigning, by a system comprising a processer, an inside IP address and an outside care-of IP address to a mobile host on each of a first access network and a second access network in response to a mobile host departing from the first access network and being granted access to the second access network;
  encrypting, by the system, a care-of address status message via a security association formed between the mobile host and a home agent of the first access network in response to receipt of the care-of address status message from the mobile host;
  storing, by the system, the outside care-of IP address for the mobile host in a register; and
  receiving, by the system, a new care-of address request message from the mobile host, the new care-of address request message comprising a destination address of a communicating host,
  wherein the register comprises a CURRENT CARE OF ADDRESS register, and wherein the care-of address status message is embedded in an IP-in-IP packet.

15. The method of claim 14, wherein the care-of address status message comprises a same sequence number as a sequence number in a most recently received care-of address request message.

16. The method of claim 14, further comprising storing a sequence number from a most recently received care-of address request message.

17. The method of claim 14, wherein the new care-of address request message comprises a sequence number in an embedded IP-in-IP packet that comprises the destination address of a communicating host, the IP-in-IP packet further comprising the outside IP address assigned to the mobile host by the second access network that corresponds to the outside care-of IP address assigned to the mobile host by the second access network.

18. The method of claim 14, further comprising checking whether a sequence number contained in a new care-of address request message is less than or equal to a sequence number of a most recently received care-of address request message; and, if so, storing the outside care-of IP address for the mobile host on the second access network in a CANDIDATE CARE OF ADDRESS register.

19. The method of claim 14, further comprising:
  checking whether a sequence number contained in a new care-of address request message is less than or equal to a sequence number of a most recently received care-of address request message; and, if so:
    storing the outside care-of IP address for the mobile host on the second access network in a CANDIDATE CARE OF ADDRESS register;
    bicasting packets to the mobile host at the outside care-of IP address for the mobile host on the second access network, and the outside care-of IP address for the mobile host on the first access network; and
    terminating the bicasting of packets to the first and second access networks.

20. The method of claim 14, further comprising:
  bicasting packets to the mobile host at the outside care-of IP address for the mobile host on the second access network, and the outside care-of IP address for the mobile host on the first access network; and
  terminating the bicasting of packets to the first and second access networks after a BICASTING timer expires.

* * * * *